(12) United States Patent
Periorellis et al.

(10) Patent No.: US 9,317,341 B2
(45) Date of Patent: Apr. 19, 2016

(54) DYNAMIC ATTRIBUTE RESOLUTION FOR ORCHESTRATED MANAGEMENT

(75) Inventors: Panos Periorellis, Aachen (DE);
Christian Kratzsch, Aachen (DE);
Lucas Bordeaux, Cambridge (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 512 days.

(21) Appl. No.: 13/114,041

(22) Filed: May 24, 2011

(65) Prior Publication Data
US 2012/0304195 A1 Nov. 29, 2012

(51) Int. Cl.
*G06F 9/46* (2006.01)
*G06F 9/52* (2006.01)

(52) U.S. Cl.
CPC ........................................ *G06F 9/52* (2013.01)

(58) Field of Classification Search
None
See application file for complete search history.

(56) References Cited

U.S. PATENT DOCUMENTS

| | | | |
|---|---|---|---|
| 6,779,182 B1 * | 8/2004 | Zolnowsky | 718/103 |
| 7,062,537 B2 * | 6/2006 | Aziz et al. | 709/206 |
| 7,644,377 B1 * | 1/2010 | Saxe et al. | 716/106 |
| 7,647,595 B2 * | 1/2010 | Chandrasekaran | 719/318 |
| 2003/0149717 A1 * | 8/2003 | Heinzman | 709/101 |
| 2005/0027871 A1 | 2/2005 | Bradley et al. | |
| 2006/0053423 A1 * | 3/2006 | Jones et al. | 718/100 |
| 2008/0320486 A1 * | 12/2008 | Bose et al. | 718/105 |
| 2009/0241117 A1 | 9/2009 | Dasgupta et al. | |

FOREIGN PATENT DOCUMENTS

EP 2093977 A1 8/2009

OTHER PUBLICATIONS

McGlynn, Liam, "Accelerating Problem Resolution: Why It Matters and How to Do It"., Retrieved at <<http://www.itsmsolutions.com/newsletters/DITYvol5iss10.htm>>, Mar. 11, 2009, pp. 1-3.
Brittenham, et al., "IT service management architecture and autonomic computing", Retrieved at <<http://ieeexplore.ieee.org/stamp/stamp.jsp?arnumber=05386560 >>, IBM Systems Journal, vol. 46, No. 3, 2007, pp. 565-581.
"Improving IT Service Delivery and Quality through Automation", Retrieved at <<http://download.microsoft.com/download/0/2/F/02F642A6-3DA7-46F9-8648-448F66A96C17/DS%20%20Opalis%20Automating%20Processes%20Across%20the%20Datacenter%20Final.pdf>>, Retrieved Date: Mar. 7, 2011, pp. 3.
"RES Automation Manager 2011", Retrieved at <<http://www.interact.be/PDF/RES/automation_manager[1].pdf>>, Retrieved Date: Mar. 8, 2011, pp. 4.
"FireScope Orchestrate Solutions", Retrieved at <<http://www.firescope.com/Solutions/Orchestrate/Default.asp>>, Retrieved Date: Mar. 8, 2011, pp. 4.
"Managing Groups of Computing Entities", U.S. Appl. No. 12/956,281, filed Nov. 30, 2010, pp. 39.

* cited by examiner

*Primary Examiner* — Gregory A Kessler
(74) *Attorney, Agent, or Firm* — Sandy Swain; Micky Minhas

(57) ABSTRACT

A method is provided herein for managing a plurality of computing entities. The method includes sending a dynamic attribute dependency to one or more of the computing entities. The dynamic attribute dependency specifies a constraint for performing the management operation based on a dynamic attribute of each of the one or more computing entities. Additionally, the method includes scheduling, based on the plan, an atomic task configured to perform the management operation on each of the one or more a computing entities based on whether the constraint is resolved. The method further includes performing the atomic task if the constraint is resolved.

12 Claims, 12 Drawing Sheets

200

| Atomic Task ID | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Operation | Firmware Update | | | | | | | | Application Update | | | | | | | |
| Robot Type | Non-Critical Mobile | | Non-Critical Immobile | | Critical | | IP Range | | Non-Critical Mobile | | Non-Critical Immobile | | Critical | | IP Range | |
| Robot ID | 1 | 2 | 3 | 4 | 5 | 6 | 7 | 8 | 1 | 2 | 3 | 4 | 5 | 6 | 7 | 8 |
| Dynamic Filter | CPU < 50% | | | | | | | | | | | | | | | |
| Timeout | 1 Hour | | | | | | | | | | | | | | | |

DYNAMIC ATTRIBUTE RESOLUTION FOR ORCHESTRATED MANAGEMENT

BACKGROUND

Groups of computing entities may include servers in a server farm, networked computing entities at an Enterprise, collections of embedded entities such as printers, household appliances, medical equipment at a hospital, etc. Typically, the management of such groups is performed by one or more administrators on a periodic basis. For example, to install a new software upgrade at servers in a server farm, the administrator carries out management operations on each server. The administrator uses his or her expertise to carry out the upgrades in a complex, and time-consuming process. Administrators typically use their own expertise to manually schedule, and launch, management operations in appropriate sequence. Management operations may include system updates, rebooting individual computing entities, loading new software components, etc. In some cases, management operations may be applied to subgroups of computing entities, such as all the machines used in a manufacturing process.

Deciding whether an entity (PC, Server, Service, Application) is in a management-ready state depends on properties that are static (location, configuration, name, identity related attributes) and dynamic. Dynamic attributes have values that may change over the course of the management operation life cycle. Static information may be retrieved from sources such as databases. No such resources are available for dynamic attributes.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The claimed subject matter provides a method for managing a plurality of computing entities. The method includes sending a dynamic attribute dependency to one or more computing entities. The dynamic attribute dependency specifies a constraint for performing the management operation based on a dynamic attribute of each of the one or more computing entities. Additionally, the method includes scheduling, based on the plan, an atomic task to perform the management operation on each of the one or more computing entities based on whether the constraint is resolved. The method further includes performing the atomic task if the constraint is resolved.

Additionally, the claimed subject matter provides a system for managing a plurality of computing entities. The system includes a processing unit and a system memory. The system memory comprises code configured to direct the processing unit to send a dynamic attribute dependency to one or more of the computing entities. The constraint specifies a condition for a dynamic attribute of each of the one or more computing entities. The constraint is resolved if the condition is met during a specified time range. The code is also configured to direct the processing unit to schedule, based on the plan, an atomic task configured to perform the management operation on each of the one or more computing entities based on whether the constraint is resolved. The code is also configured to direct the processing unit to perform the atomic task if the constraint is resolved.

Further, the claimed subject matter provides one or more computer-readable storage media. The computer-readable storage media may include code configured to direct a processing unit to send a dynamic attribute dependency to each of the one or more computing entities. The code is further configured to direct the processing unit to schedule, based on the plan, an atomic task configured to perform the management operation on each of the one or more computing entities based on whether the constraint is resolved. Additionally, the code is configured to direct the processing unit to determine that the constraint is resolved asynchronously, and perform the atomic task if the constraint is resolved.

Many of the attendant features will be more readily appreciated as the same becomes better understood by reference to the following detailed description considered in connection with the accompanying drawings.

BRIEF DESCRIPTION OF THE DRAWINGS

FIG. 6 is an example table of atomic tasks;

DETAILED DESCRIPTION

Figure 1:
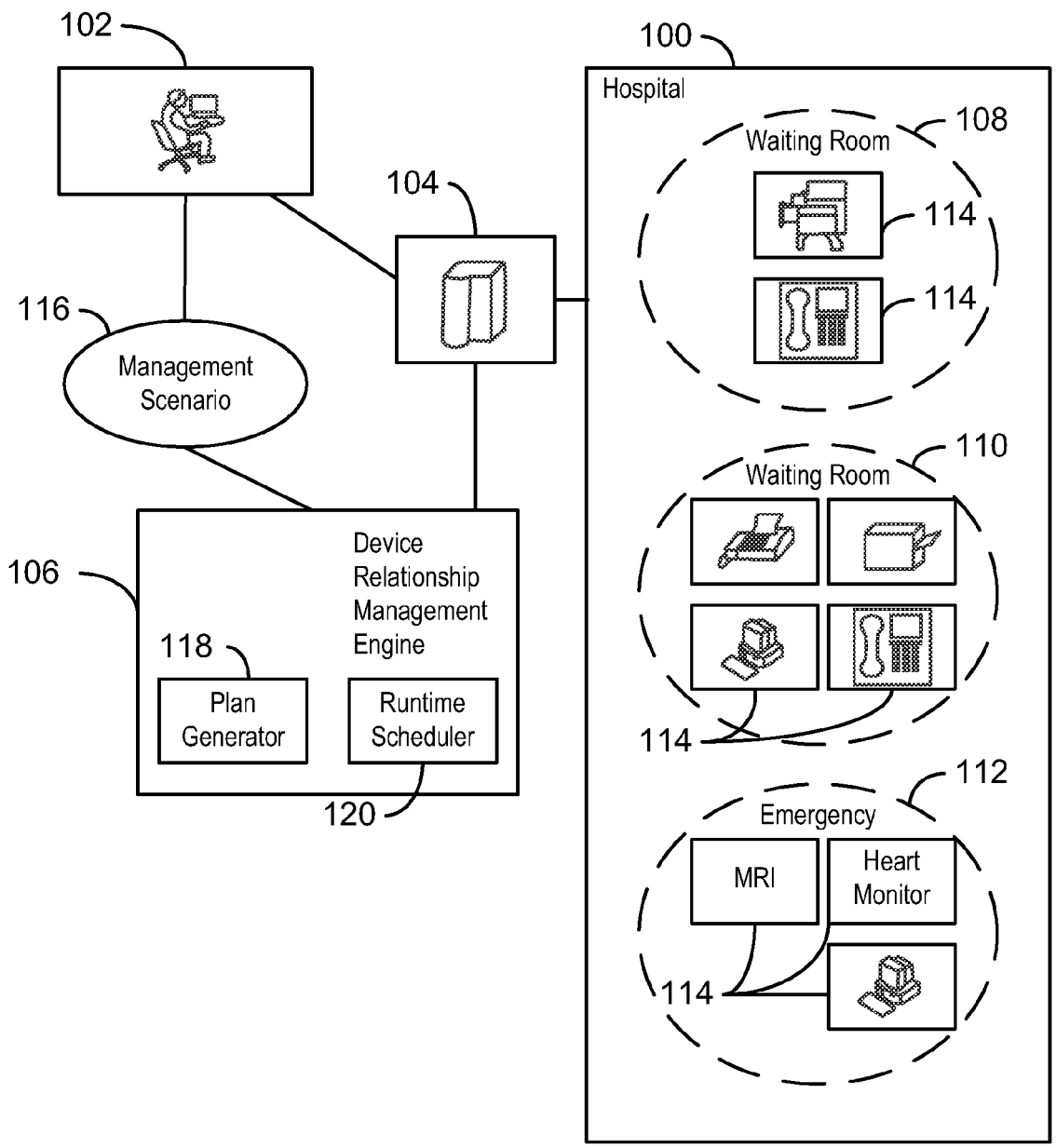
FIG. 1 is a schematic diagram of an example system for managing groups of entities.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, the terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an entity relationship management system, the system described is provided as an example and not a limitation. As those skilled in the art will appreciate, the present examples are suitable for application in a variety of different types of relationship management systems.

A group of computing entities is two or more computing-based entities where each entity has an operating system and may be any type of computing based entity. Examples of computing-based entities include a personal computer, an embedded entity, a virtual machine and a server, to name just a few. Examples of management operations include software or hardware monitoring operation, network set up or directly sending an update to an entity. Examples of updates may provide for installation of a piece of software, a patch, a library or a whole image.

Constraints may be applied to management operations using static and dynamic attributes about the entity for the management operation. Determining a dynamic attribute, such as CPU usage, may be accomplished with an architecture capable of interacting with the entity to be managed. More specifically, the architecture may enable determining the dynamic attribute at the moment the management operation is to be applied. Advantageously, such an architecture may enable dynamic planning for management operations, where decisions may be made based on real-time information.

FIG. 1 is a schematic diagram of an example system for managing groups of entities. In this example, a plurality of entities are located in a hospital 100, however the entities may be in any appropriate location, for example, a data centre, school, library, university or office. The entities can be grouped according to their location. For example, a first group 108 of entities is located in the waiting room, a second group of entities 110 is located in the reception and a third group of entities is located in the emergency room 112. In another example, the entities 114 may be grouped according to their level of criticality. For example, a camera and a phone located in the waiting room are less likely to be critical than an MRI scanner or a heart monitor in the emergency room.

The level of heterogeneity of entities and entity operations in, for example, a hospital 100 makes management of the entities difficult. A wide range of computing based entities 100 may be found in a hospital, for example; cameras, telephones, printers, fax machines, personal computers, MRI scanners or heart monitors. Often an administrator 102 who wishes to define a management operation, for example, sending a security update, sends the update to each entity under their control individually which may be very time consuming. The administrator may group entities according to operating system or operating system version. However, there are no semantics associated with such a collection and management operations are carried out on each machine in turn, disregarding the dependencies between machines. For example, an administrator may first update a non-critical entity in the waiting room and then wait for a period of time to see how the update performs before updating more critical systems in the emergency room individually.

In the embodiments described herein entities can be grouped according to a specific function. Custom semantics are created for groupings in order to constrain a management scenario 116 as to how an update should be carried out prior to committing a management operation. For example, entities may be dependent on one another, constrained by the environment or by the applications run on them. These dependencies and constraints can be expressed in a processable format so that the management servers can process and resolve them.

For example, an administrator 102 may wish to apply an update to fix a recurring critical error on a plurality of entities 114. The administrator 102 may wish to roll out the fix incrementally, so that entities with a lower level of criticality, for example, a waiting room camera, is updated first so that any problems with the update can be detected before entities with a higher level of criticality, for example, a magnetic resonance imaging(MRI) scanner, are upgraded.

In another example, an administrator 102 may wish to ensure that a firmware update is correctly applied before applying an application update. In this example, the two updates must be applied in order, if and only if the firmware update is correctly applied is the application update applied. In another example, some of the entities 114 are virtual entities and an administrator 102 may wish to apply updates to any physical entities before applying the update to the virtual entities.

The administrator 102 can create a management scenario 116. The management scenario 116 is expressed in a language which is implicit and precise when expressing the dependencies between entities and success criteria for the application of a management operation. The management scenario comprises; a list of tasks to perform, dependencies between tasks and timing information. A task can comprise one or a list of several entities and a management operation to be performed on those entities. Dependencies can be defined based on static entities properties, for example, "apply updates on version 1 entities before version 2 entities", and synchronization dependencies, for example, "update A and update B start at the same time." Timing information may be a timescale for successful completion of the management operation. Specifying dependencies between entities provides administrators with additional control as to how management operations are carried out and increases the efficiency of managing updates. Further, management operations may be scaled to large numbers of entities rather than carried out on each entity individually.

Dependencies may also be defined according to dynamic properties. For example, a management operation may only be allowed if CPU usage is below 50% of capacity. In an example, a user may specify such dependencies with a standardized syntax. Such expressions may be interpret, and then used to create software that interrogates the entity about the dynamic attributes. Because entities may be engaged in tasks of higher priority than the management operation, the entities may be interrogated at a time close to actually performing the management operation. The expression may be evaluated as either true or false. When the expression evaluates to true, the management operation may be carried out. When false, the management operation may be halted, otherwise not allowed.

The management scenario 116 can express, in a non-exhaustive list of examples; ordering among entities, priorities among operations, synchronization, resource constraints and entity attributes. Ordering among entities enables administrators to express the order in which management operations have to occur, for example, "manage entity a, then entity b, then entity c." Expressing priorities among operations enables administrators to express the pre-requisite and post-requisite actions, for example, "application update must precede firmware update." Synchronization enables administrators to define common starting points and criteria of success for specific updates. Resource constraints enable administrators to express the requirements in the form of a dynamic dependency as described above. Entity attributes allow administrators to specify management operations according to those entity attributes, for example, "update virtual machines last."

The user defined management scenario 116 is input into an entity relationship management engine 106 which is executed at a management server 104. The entity relationship management engine comprises a plan generator 118 and a runtime scheduler 120. The plan generator 118 computes and validates a management plan from the management scenario. In an example, the plan generator can be a dependency resolver which resolves dependencies between tasks in the management scenario. The runtime scheduler runs the tasks contained in the plan and monitors their outcome making sure that all conditions specified in the plan are respected.

Figure 2:
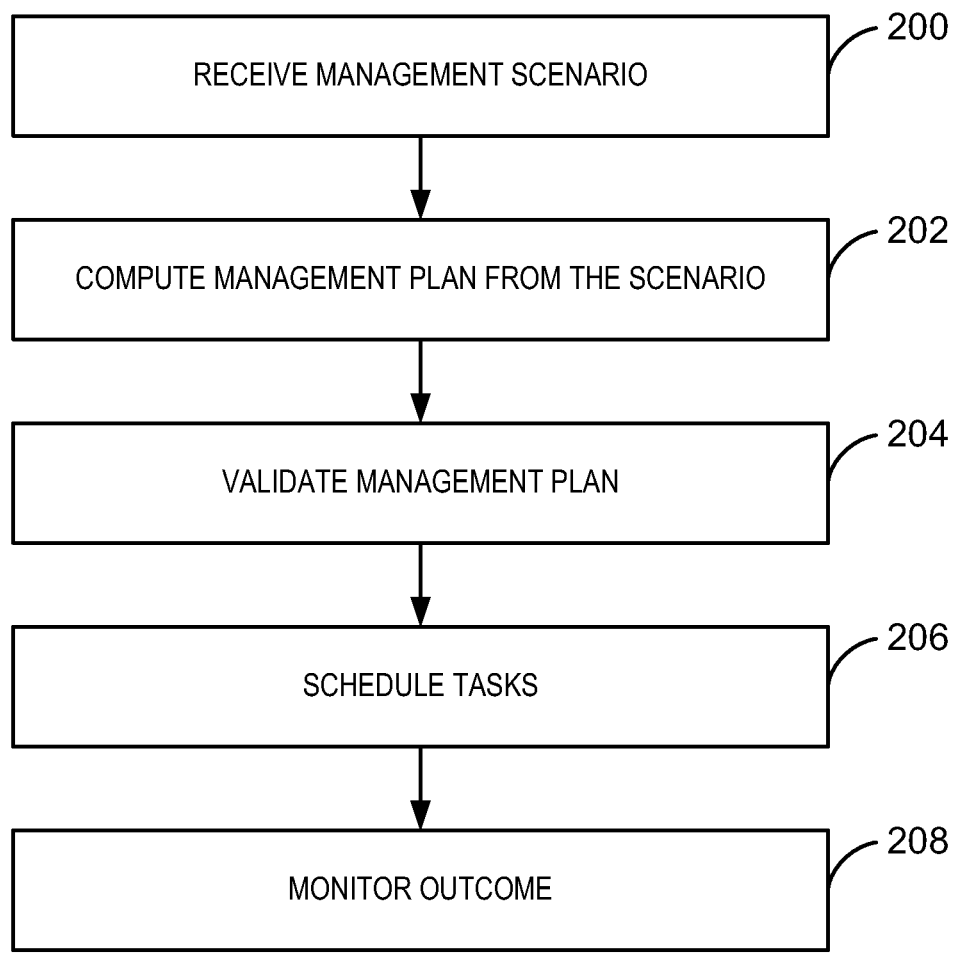
FIG. 2 is a flow diagram of an example method at an relationship management engine.

FIG. 2 is a flow diagram of an example method at an entity relationship management engine. A management scenario is received 200 which specifies tasks and optionally dependencies and timing information. The plan generator 118 computes 202 a management plan from the scenario. The management plan represents the information from the scenario (e.g. tasks and dependencies) in a more explicit form which is suitable for input into a runtime scheduler 120. Computing the management plan from the management scenario is described in more detail with reference to FIG. 4.

The plan may be validated 204 by carrying out safety checks. In an example, validation may comprise carrying out checks to ensure no ordering conflicts exist. Processing and validation of a management scenario is described in more detail with reference to FIG. 5-8.

Tasks in the computed management plan are scheduled 206 by the runtime scheduler 120. The runtime scheduler executes the tasks and monitors 208 the outcome to ensure that all pre and post conditions set up by the administrator are respected. An example method of executing tasks at the runtime scheduler is described with reference to FIG. 7.

Figure 3:
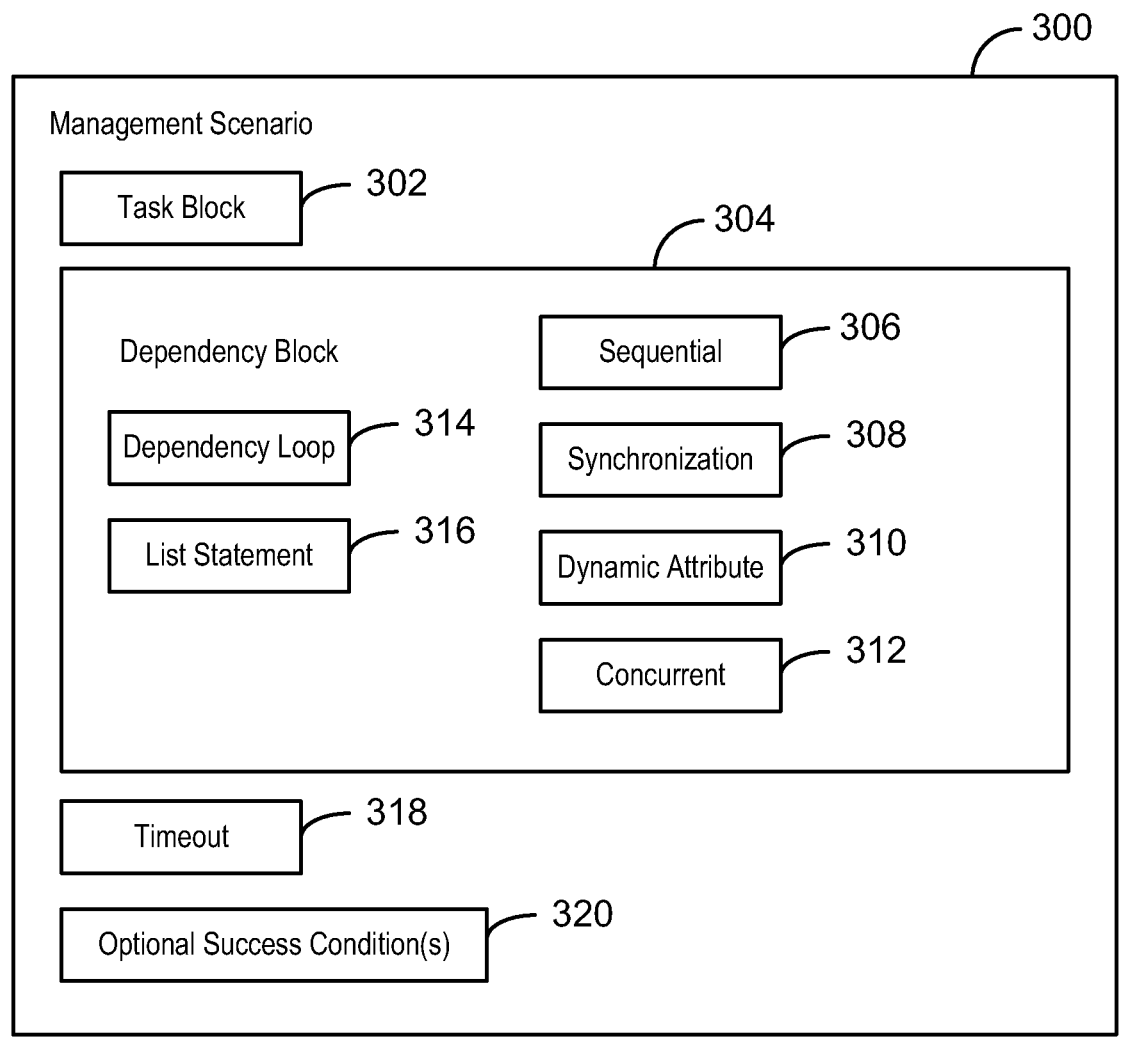
FIG. 3 is a schematic diagram of an example management scenario.

FIG. 3 is a schematic diagram of an example management scenario. A management scenario 300 can be specified by the user at a user interface. The interface may be a graphical user interface or a text based interface. The syntax allows multiple entity management scenarios to be expressed in a succinct way, allowing scaling to a very large number of managed entities.

The management scenario 300 comprises a task block 302 and optionally one or more dependency blocks 304. A dependency block comprises one or more dependency statements which may be one or more of a sequential dependency 306, a synchronization dependency 308, a dynamic attribute dependency 310, a concurrent dependency 312, a dependency loop 314 and a list statement 316.

The management scenario may optionally include timeout 318 details and one or more success conditions 320. If no timeout is specified in the management scenario then a default timeout may be used. In an example, where a timeout 318 is specified by the user all tasks in the scenario have their timeout set to the given duration. In another example, where the timeout 318 is specified by the user different tasks may have timeouts of different durations. A success condition 320 may be that the task completes within the timeout interval. Another example of a success condition 320 is that a certain percentage of all tasks complete within a specified period.

In an example, a management scenario may be expressed in Backus-Naur Form (BNF) format as now shown, where bold characters are language reserved words: <management scenario>::=tasks <task block>dependencies <dependency block>ptional; there may be no dependencies default timeout <duration>timeouts <list of timeouts>ptional, if missing the default timeout applies Here square brackets are used to denote optional items which in this case are the dependencies and timeouts. The double forward slashes are used to indicate comments as opposed to functional parts of the management scenario.

The task block 302 states which tasks are to be performed. It comprises one or more task statements. A task statement may be a single atomic task, i.e. one management operation applied to one entity, or a task loop which applies a task to a plurality of entities, or a plurality of atomic tasks. A task block states which tasks are to be performed and the entities which the specified tasks are to be applied to. For example, using BNF format an example task block is now described. <task block>::=(<task statement>this explains that a task block is formed from one or more task statements <task statement.::=<task loop>|<task in task blockhis explains that a task statement is either a task loop or a task <task loop>::=foreach <id> in <list> {<task blockhis gives the form of a task loop <task in task block>::=apply <operation> to <list of entity task in the task block may corresponds to an operation to be applied to a list of entities <operation>::=identifier of operation is identified by any suitable identifier such as a string with name and arguments.

A management scenario may comprise one or more lists as mentioned above. A list, denoted in BNF in this document as <list> may be a list of attributes, a list of tasks, a list of entities, or a list of sequential items. A sequential item is a task with a specified success condition and a specified wait time to elapse after successful completion of that task before commencing the next sequential item in a list of sequential items. In an example, a list of attributes may be either an explicit enumeration of one or more attributes, a range of attributes, or a list variable. A list of sequential items may be an explicit enumeration of one or more sequential items or it may be a list variable. A list of tasks may be an explicit enumeration of one or more tasks in a dependency block or it may be a list variable. A list of entities may be either an explicit enumeration of one or more entities, or specification of criteria to select entities using a filter, or a list variable. In the case that a list of entities comprises criteria to select entities using a filter then the filter <filter> may be any well formed expression comprising one or more of: attribute names, constants (e.g. numbers, true, false), logical operators and predicates. For example, the predicate running P is true when process P is running on an entity. An example of a filter is RAM>1024. Another example of a filter is IP=123.45.6.7. In an example, the filter "true" is satisfied by all entities.

In BNF lists may be expressed as: <lists>::=<list of attributes>|<list of tasks>|<list of entities>|<list of sequential item his explains that a list may be a list of attributes, tasks, entities or sequential items. <list of attributes> ::=<id>+] |<id> . . . <id>] <list-varHere square brackets are part of the language rather than stating optional constructs. This explains that a list of attributes may comprise an explicit enumeration, a range of attributes or a variable. <list of tasks>::=<task in dependency block>+]|<list-var> <list of sequential items>::=<sequential item>+]|<list-var> <list of entities>::=(<entities>+)|select entities where <filter>|<list-varhis explains that a list of entities may comprise an explicit enumeration, a range of entities or a variable. entity>::=identifier of entity (e.g. constant or iterator variable)

List declarations and push backs may be defined for lists of tasks. These constructs are used in a management scenario to express succinctly a large collection of clusters of entities without the need to list all clusters explicitly. For example: <list statement>::=list <list-vathis declares a list and initializes it to an empty list. <list statement>::=pushback <list-var><idthis appends a new element to a list. Here <list-var> is a variable symbol that may be declared with "list <list-var>" and <id> identifies an element, for example, a task in a dependency block, which will be appended to the list.

A management scenario may comprise zero, one or more dependency blocks as mentioned above. A dependency block 304 comprises one or more dependency statements where a dependency statement may be a dependency loop, a list statement, a sequential dependency, a dynamic attribute dependency, a synchronization dependency or a concurrent dependency. For example, using BNF format: <dependency block>::=(<dependency statement>)+<dependency statement>::=<dependency loop>|<list statement>|<sequential dependency>|<dynamic attribute dependency>|<synchronization dependency>|<concurrent dependency> <dependency loop>::=foreach <id> in <list> {<dependency-block>} <sequential dependency>::=respect ordering <list of sequential items> <sequential item>::= <task>success condition <condition>]wait <duration> after completion]

The semantics of a sequential or ordering dependency 306 are "perform each task in the list in order." For example, the order may be the order specified by the list. An amount of time may be specified by <duration> which may be a time that the runtime scheduler is to wait before moving to the next task. The duration may be expressed by a date object in a predefined format, for example, "1 week", "12 hours" etc. In an example, the default wait value is 0. In an example, the runtime scheduler is arranged so that the next task may start only when a success condition of the current task is fulfilled. For example, the next task could start when the current task is completed on 80% of entities. The success condition may have the form <number>% completed and states the minimum percentage of successful atomic tasks that are required to move on to the next iteration. In an example, a default success condition value is 100% however, more complicated expressions containing logical operators such as disjunction and conjunction may be used. It is not essential to use a success condition.

Where a dependency is a synchronization dependency 308 all tasks in the list are to start executing at the same time. For example, each of the tasks may start only when the conditions of all of them are satisfied. An example of a synchronization dependency expressed in BNF format is; <synchronization dependency ::=synchronize <list of tasks>.

Where a dependency is a dynamic attribute dependency 310, for each entity in the task the operation can start running only when a dynamic filter is satisfied on that entity. If, on a particular entity, a timeout is reached before the dynamic filter is satisfied, the operation is marked as failed on that entity. For example; <dynamic attribute dependency>::= <task> when <filter>.

Where a dependency is a concurrent dependency 312 it specifies that at most k tasks at a time are worked on. The k tasks can be processed in any order. If a success condition is evaluated as false then non of the remaining tasks are started. For example:

<dependency statement> :: = <concurrent dependency>
<concurrent dependency> ::= concurrently at most <integer value>(<list of tasks>)next when <condition>]

Several examples of management scenarios are now given.

In an example, where an administrator wishes to prioritize management operations such that all application updates follow firmware updates as described with reference to FIG. 1, the management scenario may be specified as; tasks for each d in (select entities where true) apply firmware-update to d apply application-update to d dependencies for each d in (select entities where true) respect ordering ((firmware-update, d) (application-update, d) where the language reserved word "apply" applies an update and the language reserved words "respect ordering" enforces that the firmware update is applied before the application update. In this example, the task block comprises a task statement which is a task loop that applies operations to entities filtered according to criteria. The criteria used may be entity attributes for example, and are not given In this example, for clarity. In this example, a dependency block is present and it comprises a dependency statement which is a dependency loop. That dependency loop applies a sequential dependency which In this example, is that firmware updates must be applied before application updates.

In another example, an application update is sent to non-critical entities first. After it has been applied to non-critical entities the administrator may wish to wait for a period of time before the update is applied to critical entities in order to determine how the update is performing. A dependency block of a management scenario may be specified In this example, as; dependencies (respect-ordering (my-operation, (select entities where (critical=false), wait 1 week after completion) (my-operation, (select entities where (critical=true)) In this example, a sequential dependency is used to apply the application update (called my-operation in this example). A filter is used to select critical entities. This illustrates how entity attributes such as critical/non-critical may be used.

In another example, an administrator requires to prioritize according to entity physical and virtual characteristics. Suppose an application update is to be sent to entities that have more than 1 GB of RAM. In this case an example task block is: tasks foreach (d in (select entities where (RAM>1024))) apply application-update to d. This example illustrates how a filter may be used in the task block to select entities with particular attributes. In some example, the entity attributed may be dynamic such as available CPU.

In another example, an administrator requires to carry out a management operation only where entities are not running a particular process. This is possible by using a task block comprising: foreach d in (select entities where true) (upgrade-operation, d) when (not (running x)). In this example, whether an entity is running process x is an example of a dynamic entity attribute.

In an example, where an administrator wants to send a security update to a server farm composed of clusters of servers, the administrator can define the order in which the security update will be performed. For example, the administrator applies a success condition so that at least 80% of the machines in each cluster are to be updated before the next cluster update may begin. An example dependency block of a management scenario may comprise list mylisdeclare a new variable foreach id in 1 . . . 100] pushback mylist (security-update, (select entities where clustered-id), success condition 80% completedppend new element (sequential item) to list respect ordering mylistThis example, illustrates the use of list declarations and pushbacks to create lists of sequential tasks with success conditions. A variable mylist is declared for a list of tasks. This list is populated by looping through 100 clusters (in this example) and adding tasks to the list as sequential items. Each task added is the task of applying the security update to entities in the cluster with a success condition that 80% of the entities in that cluster have successfully had the security update applied. The order of the tasks in mylist is then enforced using a sequential dependency statement "respect ordering mylist."

Figure 4:
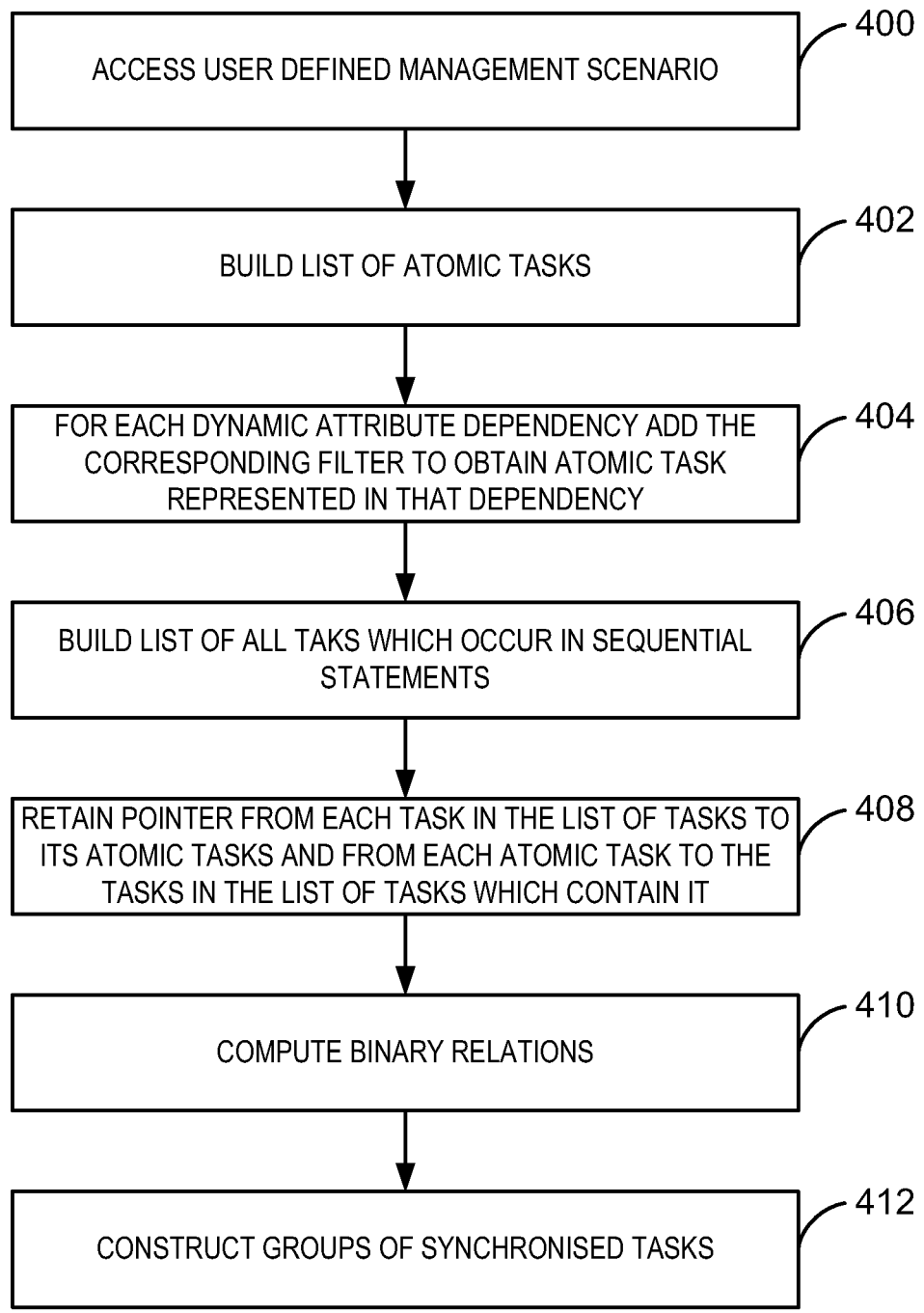
FIG. 4 is a flow diagram of an example method of computing a management plan.

FIG. 4 is a flow diagram of an example method of computing a management plan. As described above with reference to FIG. 2 a management scenario is received by an entity relationship management engine executed at the management server. The plan generator 118 accesses 400 the user defined management scenario and computes and validates a management plan. The management plan represents information from the management scenario with atomic tasks and more explicit dependencies. In an example, the plan is a structure where P=(,~,<,G,T,€ ), and the symbol represents a list of atomic tasks, ~ is a list of binary synchronization relation between atomic tasks, < is a list of ordering binary relations between atomic tasks, G is a collection of groups of synchronized atomic tasks, T is a list of high level (non-atomic) tasks that occur in sequential statements (also referred to as tasks with success conditions (TSCs)) and € is a list of ordering binary relations between tasks in T.

The list of atomic tasks is built 402 by expanding into atomic tasks the task lists in the management scenario introduced by the tasks keyword. A copy of each atomic task is kept. An atomic task is a pair comprising an entity and a management operation to be applied to the entity. Each atomic task may have a dynamic filter (obtained from any dynamic attribute dependency statements) and a timeout threshold. Each atomic task belongs to zero or more tasks from T.

The process of forming the management plan comprises, for each of the dynamic attribute dependencies, add 404 the corresponding filter to each atomic task represented in that dependency.

As mentioned above ~ is a list of synchronization binary relationships between atomic tasks. In an example, if two atomic tasks a and b are contained within the same synchronization statement, after all tasks in the synchronization statement have been expanded into atomic tasks then the relation between the tasks is defined as a~b. For each atomic task a the relation a~a holds as well. ~ can be extended to it's transitive closure.

Transitive closure computation can be carried out using, for example, a graph analysis algorithm for finding the shortest points in a weighted graph in order. For example, a bi-dimensional table T~ can be computed which is a list of tasks and their synchronization relations. Examples of graph analysis algorithms are the Floyd-Warshall algorithm and Repeated matrix Multiplication. However, any suitable graph analysis algorithm may be used.

Ordering binary relations between atomic tasks are represented by <. Given two atomic tasks a and b, where there are two tasks u and v, such that a∈u and b∈v. Further, if u€ v, a relationship a<b can be defined. The ordering relation < can be obtained by combining < and ~ and by computing the transitive closure. An ordering binary relation a<b states that the activation condition of atomic task b depends directly on the success or failure of atomic task a, therefore the runtime scheduling algorithm should schedule a earlier than b.

T is a list of all tasks that occur in sequential statements 406. Tasks from sequential dependencies are tracked as they have success conditions which need to be evaluated for a task seen as a group of atomic tasks (e.g. the task succeeds when 80% of the contained atomic tasks succeed) There is no need to keep track of other non-atomic tasks in the management plan (such as those present in a dynamic attribute dependency) as the information they contain will be passed on to the level of atomic tasks. There is an ordering binary relation € between tasks in T which are high level, non-atomic tasks. For example, for two tasks u and v, if u comes before v in a sequential statement then u€ v.

In an embodiment all tasks that belong to concurrent dependencies can also be added to T. In an example, a concurrent dependency statement allows the performance of at most one task at a time (1-concurrency). This requires performing the tasks in order without imposing a specific ordering a priori. A 1-concurrency is therefore similar to a sequential statement except that in the former an actual ordering € of the tasks is decided dynamically at the execution time. New ordering binary relations € between tasks in T introduce new ordering binary < relations between atomic tasks according to the definitions of p and <.

The process of forming the management plan involves retaining 408 pointers from each task in the list of tasks T to that task's atomic tasks; and from each atomic task to the tasks in the list of tasks T which contain that atomic task. The binary relations: synchronization binary relation ~ between atomic tasks, ordering binary relation < between atomic tasks, and ordering binary relation € between tasks with success conditions are computed 410. In an example, this may be achieved by forming table data structures and populating those with trlse values as described in more detail below. However, it is not essential to use table data structure in this way any suitable data structure can be used to represent binary relations between tasks Other types of data structures or methods of computing the binary relations may be used.

Groups of synchronized tasks G are constructed 412. A group of synchronized tasks is a maximal set of atomic tasks that are synchronized with each other as a result of synchronization dependencies in the original management scenario. If the synchronization binary relations ~ between the atomic tasks are represented as a graph for example, each element in G is one connected component of the graph. Once a plan has been constructed from the management scenario it is possible to validate the plan to ensure that there are no scheduling conflicts.0053]

A pseudo code example of an algorithm for computing a management plan is now given. In this example, a management scenario is provided as input and has the following structure.

Management scenario, comprises a list of tasks, a list of ordering dependencies between tasks, a list of dynamic attribute dependencies, and a list of synchronization dependencies. For clarity In this example, contains not only dynamic filters but also timeout information, even though in at least some examples these two types of information are provided with separate statements.

Plan Computation Algorithm

{Input: S, a management scenario; Output: P, a plan structure}

Q BuildAtomicTasks( )0058] AttachDynamicFilterInfo(, R)

T_~Q BuildATSynchronizationTable(,) {build the ~ relation as a bi-dimensional table (matrix)}0060]

Q BuildSynchronizationGroups(T)_~)

Q BuildTasksWithSuccessCondition( )

T_Q BuildTOrderingTable (,) {build the relation as a bidimensional table)

T_<Q BuildATOrderingTable (T_~(,T)]_,) {build the < relation as a bi-dimensional table} return P=(,T_~,T_< , , , T_)

The first step of the plan computation algorithm is computing the list of atomic tasks. A BuildAtomicTasks procedure (as shown below) expands all tasks into atomic tasks and keeps one copy of each atomic task. Each atomic task may have a dynamic filter and a timeout threshold. These may be obtained as detailed in the below example pseudo code of the AttachDynamicFilterinfo method:

The next step of the plan computation algorithm uses the BuildATSynchronizationTable to calculate the synchronization binary relation between atomic tasks. This is done by forming a bi-dimensional table, matrix or grid and initializing all the table cells to false. For example, the table has a column for each atomic task and a row for each atomic task. Table cells are marked true if a binary synchronization relation exists for the pair of atomic tasks indexed by that cell. The synchronization relations are found from the synchronization dependencies of the management scenario and also by computing transitive closure using the Floyd-Warshall algorithm or similar process. A pseudo code example is given below for this procedure. As soon as this atomic task synchronization table is formed and populated then they synchronization groups, which are connected components in a graph of the synchronization relation may be computed. Pseudo code for an example BuildSynchroizationGroups method is given below.

A list of tasks with success conditions is then built. This is done by creating a list of all tasks that appear in a sequential dependency and by giving each task a unique id. Pseudo code for an example BuildTasksWithSuccessCondition method is given below.

In order to find the ordering binary relation between tasks with success conditions a table is built, for example, using a BuildTOrderingTable process mentioned above in the plan computation algorithm. This process comprises forming a bi-dimensional table, grid or matrix data structure with one column for each task with success condition and one row for each task with success condition. The cells of the data structure are initialized to false. A cell is marked true if the two tasks indexed by the cell appear in the order specified by the cell index in a sequential dependency received from the management scenario. Propagation to transitive closure is computed using the Floyd-Warshall algorithm or similar.

In order to find the ordering binary relation between atomic tasks a table may be built, for example, using a BuildATOrderingTable process mentioned above in the plan computation algorithm. This process comprises forming a bi-dimensional table, grid or matrix data structure with one column for each atomic tasks and one row for each atomic task. The cells of the data structure are initialized to false. A cell is marked true according to a two step process. Mark a cell true if the atomic tasks it indexes (a, b) have the property: such that and. Then, set for all pairs with the property that: there exists an atomic task c such that a~c and c<b; or there exists an atomic task c such that a~c and c~b. As before, propagation to transitive closure is computed using the Floyd-Warshall algorithm.

In an example, nested loops may be use to compute the plan. In another example, only the TRUE results may be recorded. Only recording the TRUE results may potentially lead to reduced memory usage In an example, where less than half the total possible result set is TRUE.

BuildAtomicTasks Method

{Input: $u$, a list of tasks; Output: $s$, a list of atomic tasks} s ← ∅
for all u ∈ $u$ do
A ← GroundTasks (u)
for all a ∈ A do
if a ∉ $s$ then
a →$s$ {add new atomic task to list}
    give a unique id to a (e.g., its position in $s$ }
{do the next operation on the copy of a stored in $s$ }
add u to τ(a), the list of tasks that contain a
return $s$ AttachDynamicFilterInfo Method {Input: Δ, a list of tasks; Modified: $s$, a list of atomic tasks}
for all u ∈ Δ do
A ← GroundTasks (u)
for all a = ∈ A ∩$s$ do
    {do the next operation on the copy of a stored in $s$ }
    attach to a timeout and dynamic filter info from u {technically the timeout could be expressed elsewhere, not in the same place with dynamic filters...}

BuildATSynchronizationTable Method

{Input: $s$, Σ, a list of atomic tasks and a list of synchronization dependencies; Output: T __ ~ , a bi-dimensional table representing a binary relation}
    {stage1 - initialization}
    set all records of T_~ to false
    for all synchronization statements $s$ ∈$^Σ$ do
    A ← $s$ ∩ GroundTask(s)
    for all pairs (a, b) ∈ A x A do
    let i,j be the unique ids of a, b respectively
    T__~[i,j] Q ← true -continued

```
{stage2 - propagate to transitive closure with Floyd-Warshall
algorithm}
    for all k ← 1..| S | do
        for all i ← 1.. | S | do
            for all j ← 1.. | S | do
                T_~ [i, j] ← T_~ [i, j] V (T _~ [i, j]^ [(T)] _~
                [k,j])
```

BuildSynchronizationGroups Method

```
{Input: T_~, a bi-dimensional table representing a binary relation;
Output: G, the list of connected components of the graph induced by
T_~} G ← Ø
for all i ← 1..| S | do {iterate through all atomic task ids}
if ∃G ∈ G ,∃j ∈G, such that T_~ [i,j]= true then
    i →G {add this task id to G}
else
    create new group G and add it to G
    i →G {add this task id to G}
```

BuildTasksWithSuccessCondition Method

```
{Input: , Ω a list of ordering dependencies; Output: T , a list of
TSCs}
T ← Ø
for all . ω∈ Ω do // for each ordering dependency
// assume that each ordered item in the ordering dependency contains one
task for all t∈ ω do for each such a task
t→T . {add task (together with success cond and wait interval) to list
of TSCs}
return T
```

GroundTasks Method

```
{Input: V, a list of tasks (or possibly just one task); Output: A, a list
of atomic tasks that appear in V}
    A←Ø
    for all u∈V do
        for all devices d∈u do
            a ← (d, o) {o is the management operation of task u}
            if a ∈ A then
                a → A a.. A {add new atomic task to list}
    returnA
```

Figure 5:
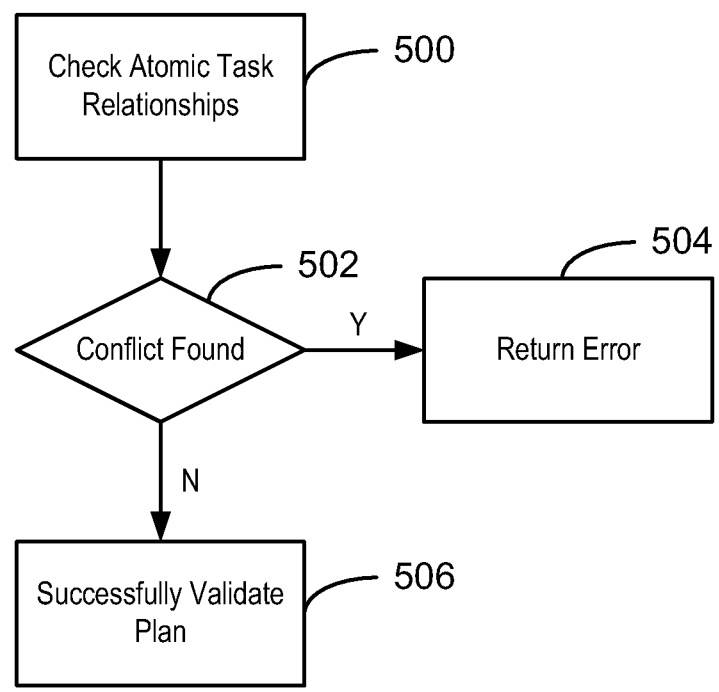
FIG. 5 is a flow diagram of an example method of plan validation.

FIG. 5 is a flow diagram of an example method of plan validation. The atomic tasks relationships in the computed plan are checked 500 for any conflicts. If a conflict in the ordering of the tasks is found 502 an error is returned 504. However, if no conflicts are found then the plan can be successfully validated 506.

In an example, dependencies formulated in the management scenario could introduce cycles in the ordering of the tasks. For example, tasks involved in such cycles could wait forever for each other to start leading to a deadlock in the execution of a management scenario. For example, a sequential dependency could require that a start before b (where a and b are atomic tasks), whereas a synchronization dependency could require that a and b start at the same time. This would introduce a conflict in the ordering of the tasks. It is possible to check whether a conflict in the ordering of the tasks is present by checking whether the computed ordering binary relation < contains records of the type atomic task a < atomic task a.

In another example, where a single 1-concurrency statement is used in a management scenario it is possible to check a priori whether there is an ordering of tasks that will not introduce an ordering conflict. For example, if there is an a~b relation between two atomic tasks that belong to distinct tasks within the 1-concurrency statement then an error will be returned 504 as there is no conflict free ordering. Otherwise a local data structure T will be initialized to be the set of all tasks in the 1-concurrency statement. A task u∈T is searched for with the property that there are no incoming edges from any other task v∈T to u, where an edge exists between v and u if ∃α∈u, ∃b∈ v&&α<b. The backwards capital E notation means "there exists" and the epsilon notation means "is a member of." The notation && means "and." If no such task u exists then an error is returned 504. If one or more u exists that satisfies the condition then u can be selected arbitrarily. The process is repeated until T is empty. An error will only be returned if and only if all possible orderings of the tasks in the 1-concurrency statement will introduce an ordering conflict, otherwise the plan will be successfully validated 506.

In another example, a plurality of 1-concurrency statements are independent if their sets of atomic tasks are disjunct and there are neither ~ nor < relations between the 1-concurrency statements. If all 1-concurrency statements are independent then checking for conflicts in the management scenario can be performed as described above for a single 1-concurrency statement and successful validation 506 can be carried out in polynomial time.

In an example, an administrator wishes to apply an application update and a firmware update for a list of robots. The administrator can express the following requirements in a management scenario; that firmware updates are to precede application updates, all updates are to be carried out on non-critical mobile entities followed by non-critical immobile entities, followed by critical entities, followed by entities with IP range from 192.68.0.0. to 192.68.0.256 and a management operation can only be carried out when an entity's CPU is running at 50% of its capacity. In this example, a timeout of one hour is specified for each update operation although any suitable timeout may be used. An example of a management scenario which fulfils this criteria, expressed in BNF format, is given below. The task block comprises two apply statements: apply firmware-update to (select entities where (robot=yes)) apply application-update to (select entities where (robot=yes)) Furthermore, there are a series of dependencies in a dependency block: foreach d in (select entities where (robot=yes)) respect ordering (firmware-update, d) (application-update, d) respect ordering ((firmware-update, (select entities where (robot=yes and critical=false and mobile=true))) (firmware-update, (select entities where (robot=yes and critical=false and mobile=false))) (firmware-update, (select entities where (robot=yes and critical=true))) (firmware-update, (select entities where (robot=yes and IP>=192.68.0.1 and IP<=192.68.0.256)))) foreach d in (select entities where (robot=yes)) (firmware-update, d) when (CPU<0.5).

The last 2 statements are repeated, using "application-update" instead of "firmware-update": respect ordering ((application-update, (select entities where (robot=yes and critical=false and mobile=true))) (application-update, (select entities where (robot=yes and critical=false and mobile=false))) (application-update, (select entities where (robot=yes and critical=true))) (application-update, (select entities where (robot=yes and IP>=192.68.0.1 and IP<=192.68.0.256)))) foreach d in (select entities where (robot=yes)) (application-update, d) when (CPU<0.5) Finally, the default timeout threshold is set: default timeout 1 hour.

The scenario is converted into a plan. For example, if there are eight robots which fall into four disjunct categories: robots 1 and 2 are non-critical and immobile; robots 3 and 4 are non-critical and mobile; robots 5 and 6 are critical; robots 7 and 8 match the filter (IP>=192.68.0.1 and IP<=192.68.0.256), as there are eight entities and two operations (e.g. application update and firmware update) there are sixteen atomic tasks in total. Each atomic task (robot i—application update) has its id set i, whereas atomic tasks (robot i—application update) have their id set to i+8. Dynamic filters, for example, CPU<50% and timeout thresholds, for example, 1 hour, are associated to atomic tasks as shown in FIG. 6. As there are no synchronization statements In this example, the only records in the synchronization table are trivial pairs a~a. As a result there are 16 synchronization groups and each of them contains one atomic task.

Figure 7:
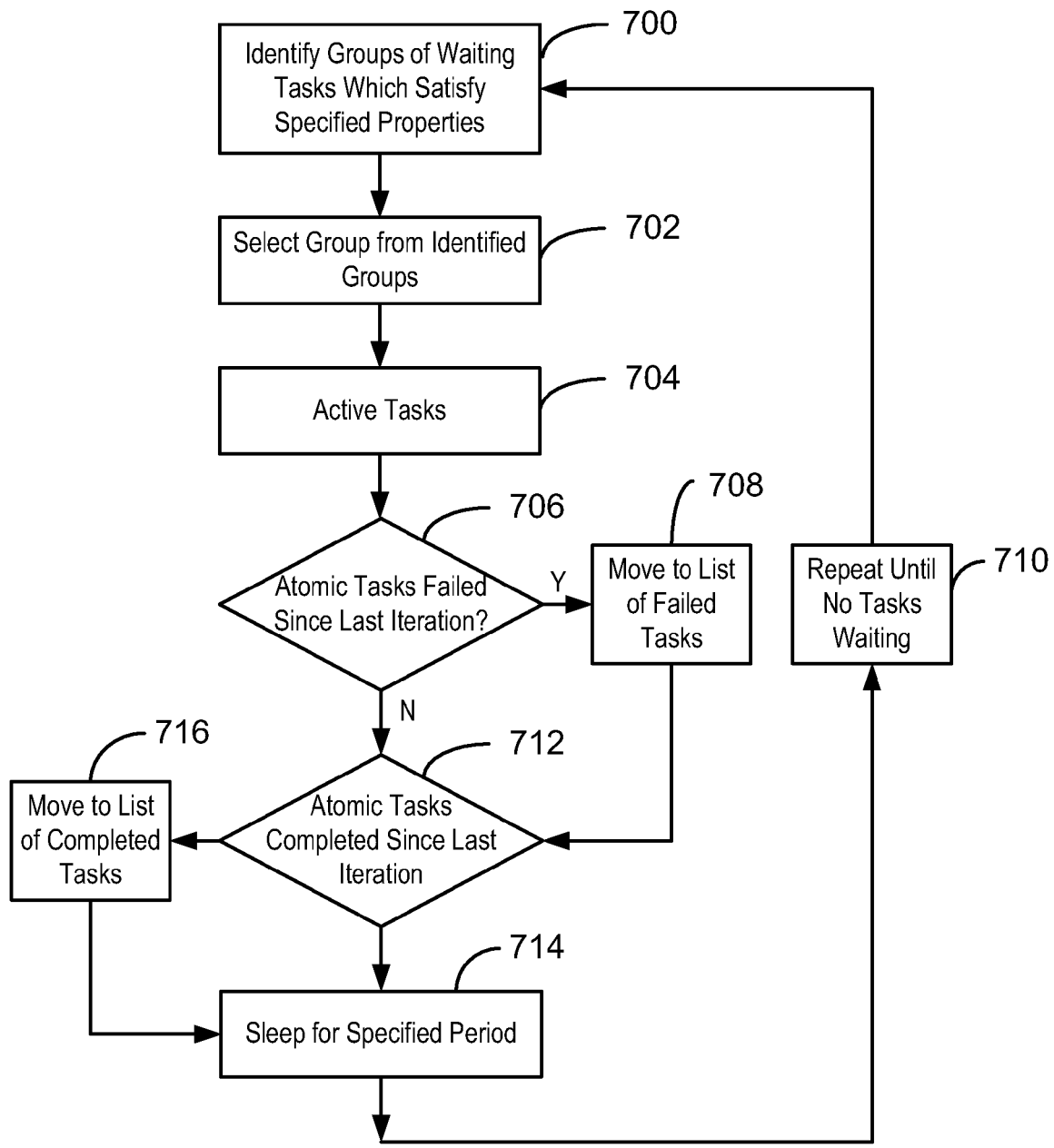
FIG. 7 is a flow diagram of an example method of scheduling tasks.

FIG. 7 is a flow diagram of an example method of scheduling tasks. After the management scenario is converted into a plan structure and tasks are verified as described above they are scheduled for execution by the runtime scheduler. In an example, scheduling is dynamic, interleaving with the execution of tasks. At scheduling time, each atomic task can be in one of the following states; waiting for activation conditions to be satisfied, active, completed successfully, or failed. In an example, checking the activation condition of an atomic task a comprises; if there exists a task u such that a∈u (that is, the atomic task a is a component or member of the task u) and there exists a task v for which a binary relation holds with u as follows: ∃v∈ u, av∈ u, a cannot become active unless the success criterion of v holds, and the wait interval of v has passed. Atomic tasks that belong to a group of more than one synchronized atomic tasks can be activated only as a group, i.e., when all their activation conditions hold. In an example, tasks have failed when one of three conditions holds; the current atomic task has timed out; the current atomic task has returned with an error code or the activation condition of an atomic task is invalidated. Activation conditions of an atomic task are invalidated if ∃u, v∈T: u∈ v, a∈v and u's success condition has been evaluated to false. Less formally, activation conditions of an atomic task are invalidated if there exists a task u and a task v which are members of the list of tasks T which occur in sequential statements; and a binary relation holds between u and v as follows u∈ v where atomic task a is a component of task v and u's success condition has been evaluated to false.

All tasks are initially in a waiting state. The runtime scheduler identifies 700 groups of waiting atomic tasks which satisfy specified properties. In an example, the specified properties are; the activation conditions of the atomic tasks hold; the atomic tasks are synchronized; and all other atomic tasks synchronized with these (if any) are in a failed state because their activation conditions have been invalidated. A group of atomic tasks may be a single atomic task in some examples.

Where one or more groups of waiting tasks satisfy the specified properties a group is selected 702 and all atomic tasks in the group are made active 704. For each atomic task which becomes active a time-out clock can be started. In an embodiment each active atomic task checks its launching condition regularly. In an example, the launching condition refers to the dynamic filters. For example, when there is one or more synchronized tasks the launching condition holds when the conjunction of all tasks launching conditions hold. When the launching condition holds, the task starts running.

The runtime scheduler checks if any atomic task has failed 706 since the last iteration. In an example, if an atomic task a fails then the success criteria of every task u T that a is part of is re-evaluated. For example, if the success criterion is 80%, then the failure of a may bring the percentage of failed atomic tasks in u to more than 20%. In an example, when the success criterion of a task in u is evaluated to false the result can be propagated further. For example, any atomic tasks that belong to v with the property u∈ v may be marked as failed because their activation conditions have been invalidated. Any tasks which have failed since the last iteration can be moved to a list of failed tasks 708.

The runtime scheduler can additionally check if any atomic task has completed 712 since the last iteration. When an atomic task completes the success criterion of every task u T that atomic task a is part of can be re-evaluated. In an example, the success or failure of a task u is important in deciding the activation condition of atomic tasks v with the property u∈ v . Any task which has completed since the last iteration can be moved to the list of completed tasks 716. The runtime scheduler may sleep for a specified period 714 before performing another iteration. This will allow tasks time to fulfill their success or failure criteria. Iterations can be repeated 710 until there are no groups of tasks waiting to be activated.

In the example described above with reference to FIGS. 6-8 atomic tasks 1 and 2 do not have to wait for other atomic tasks, therefore their activation condition is satisfied from the beginning. The scheduler will activate both of the tasks during the first two iterations of the main loop in the scheduling algorithm. As soon as atomic task 1 completes the activation condition of atomic task 7 is satisfied. However, if atomic task 1 fails then all atomic tasks from 3 to 7 will eventually be marked as failed because their activation conditions become invalidated. Similarly, as soon as atomic task 2 completes the activation condition of atomic task 10 is satisfied. As soon as both atomic tasks 1 and 2 complete, the activation conditions of atomic tasks 3 and 4 will be satisfied. The algorithm can continue iterating until every task is marked completed or failed.

In an example, the entity relationship management engine provides a method of collectively managing a plurality of computing entities. A management scenario is received that has a task block stating tasks to be performed and specifying which of the computing entities the tasks are to be applied to. In this way a user is able to collectively manage lots of entities or lots of tasks to be applied to one entity. For example, the management scenario has a dependency block comprising at least one dependency statement to be applied to tasks from the task block, the at least one dependency statement being any of a sequential dependency statement, a dynamic attribute dependency statement, and a synchronization dependency statement; where a sequential dependency statement is a list of at least two tasks to be carried out in a specified order; where a synchronization dependency statement comprises a list of at least two tasks to be started at the same time; and where a dynamic attribute dependency statement comprises at least one task to be carried out on an entity only when a dynamic filter is satisfied on that entity. For example, there may be any combination of these different types of dependency statement. Concurrent dependency statements may also be used as mentioned earlier in the document. By using the dependency block a user is able to succinctly express conditions and requirements about how the tasks are to be applied to the entities. For example, loop statements and variables may be used as described above.

A plan generator computes a management plan from the management scenario, the management plan comprising a list of atomic tasks expanded from the tasks in the task block and also comprising binary relations between pairs of tasks calculated from the dependency statement(s) in the dependency block. There are various types of binary relations that may be calculated. Some of these may be used for ordering conflict checks and other validations of the management plan. Some of these may be used to control how the atomic tasks are executed by a runtime scheduler. For example, the management plan may be used to control execution of the tasks on the entities by scheduling the atomic tasks in a manner which takes into account at least some of the binary relations calculated from the dependency statement.

An example architecture enables the resolution of dynamic constraints prior to applying a management operation on a specific target. A target may be the entity on which the management operation may be performed.

Figure 8:
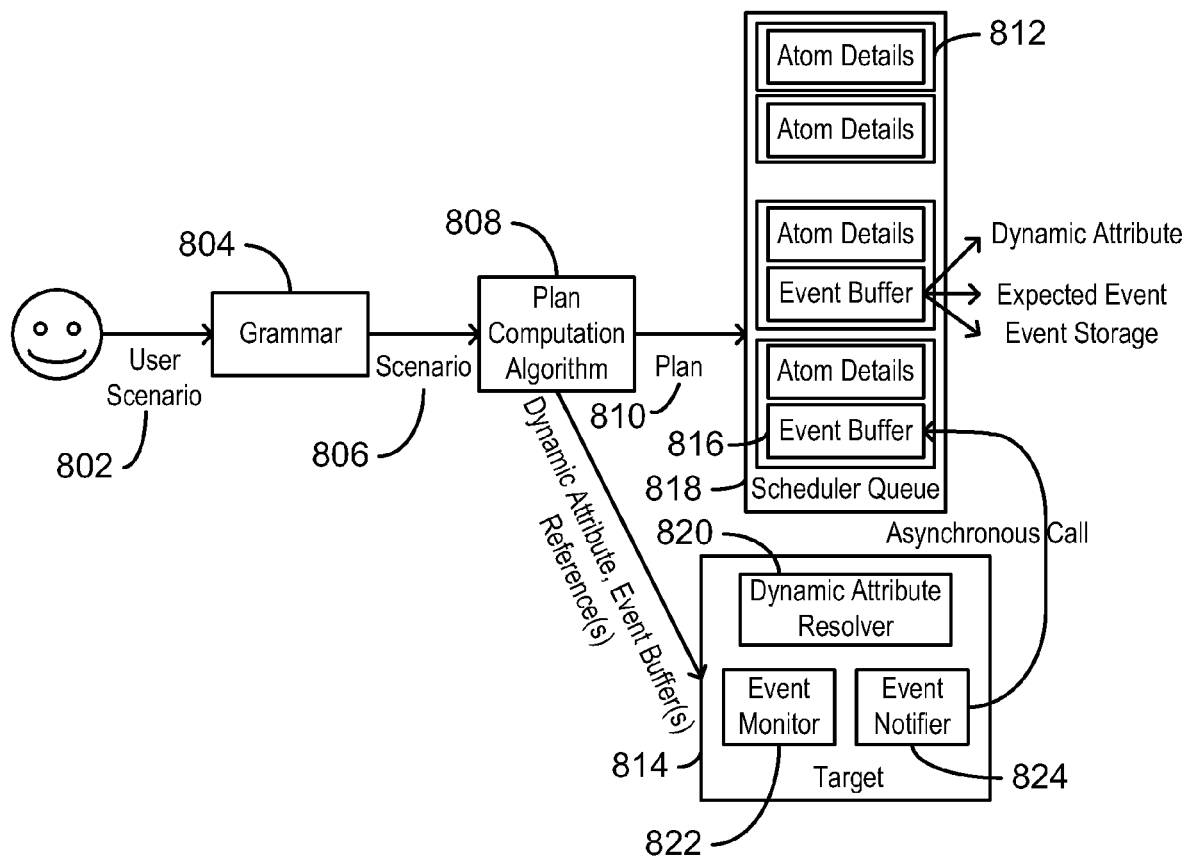
FIG. 8 is a block diagram of an example architecture for asynchronous resolution of dynamic attribute constraints.

FIG. 8 is a block diagram of an example architecture 800 for asynchronous resolution of dynamic attribute constraints. A user scenario 802 may define a management scenario with a dynamic attribute constraint. A grammar 804, such as the BNF format described with reference to FIG. 3, may be used to express the user scenario 802 as a management scenario 806. For example, the user scenario 802 may be, "Apply a patch to devices 1 and 2 when their CPU usage is at or below 50% of capacity." In the grammar 804, the management scenario 806 may be specified as "Task=((device 1, device 2), Patch, 'CPU less than or equal to 50%')." The management scenario 806 may be passed to the plan computation algorithm 808. In addition to generating a plan 810, described with reference to FIG. 5, the plan computation algorithm 808 may traverse all dynamic attribute constraints in the management scenario 806, and identify a resolution method for each. The resolution method may be asynchronous or synchronous.

The plan computation algorithm 808 may then initialize one atomic task 812 for each target 814. An example of the form in which an atomic task may be initialized is Atomic_Task_1(device1, management_operation). The atomic tasks 812 may be loaded into a scheduler queue 818. Further, the plan computation algorithm 808 may initialize, in each atomic task 812, an event buffer 816. The event buffer 816 may be a conceptual component that enables tracking the dynamic attribute constraint and the expected value of the constraint, and initializing a storage space. The atomic task 812 may use the storage space to store received events related to the dynamic attribute constraint. Once the event buffer 816 is initialized, the atomic task 812 may receive events related to the appropriate dynamic constraint. The receipt of an event may indicate that a dynamic attribute constraint has been met. At the time a management operation is to be applied, the atomic task 812 may check the event buffer 816 to determine if the dynamic attribute constraint is met. If an event has been received, the management operation may be applied. If not, the operation may be halted.

The dynamic attribute constraint may be sent to the target 814, along with a list of references that correspond to the event buffer objects. The dynamic attribute constraints refer to values of certain attributes that the target may evaluate. Examples include the CPU load usage, the number of currently running processes, the contents of a file folder, etc. A target may be asked to evaluate, for example, if a process, p, is running. Another example would be to evaluate whether the CPU usage is less than 10% percent. The communication between an atomic task—whose execution is conditioned on a dynamic attribute constraint—and a target, may be accomplished via the event buffer. Event buffer objects handle the entire life cycle of a dynamic attribute constraint. When the execution of an atomic task is conditioned on one or more dynamic attribute constraints, the atomic task initiates an event buffer for each dynamic attribute constraint. The target may then resolve that constraint. Each buffer contains a single dynamic attribute constraint and is responsible for resolving it. The buffer, as soon as it is initialized, sends the dynamic attribute constraint to the corresponding target. The target may then return the result of the evaluation of the dynamic attribute constraint to the event buffer. Since the event buffer is responsible for handling the dynamic attribute constraint, the atomic task only asks the event buffer if the constraint has been satisfactorily resolved. The event buffer contains the appropriate implementation details to allow the atomic task to ask about the resolution of the dynamic attribute constraint. The dynamic constraint may be sent by the plan computation algorithm 808, or the atomic task 812. As such, the target 814 may be informed of the dynamic attribute constraint, along with the references to the event buffers 816 where the events related to the dynamic attribute constraint may be sent. A dynamic attribute resolver 820 may then receive the constraint, and initialize, on the target 814, the appropriate components, e.g., the event monitor 822, for monitoring the dynamic attribute in the constraint. Further, the dynamic attribute resolver 818 may use an event notifier 824 to notify the referenced event buffers 816 accordingly. The dynamic attribute constraint can be sent in a serialized form, such as XML, or some other binary representation.

Following is a description of an example asynchronous resolution. A new task, t1, may be expressed in the management scenario 806, as: t1=((device1, device2), "Management Operation"). Further, a dynamic attribute constraint may be expressed as c1=(t1, "CPU Less Than or Equal to 50%"). Accordingly, the management scenario 806 may be expressed as s1=(t1, c1).

Once the event buffer 816 is initialized, the atomic task 812 knows that the dynamic constraint, "CPU Less than 50%," must be satisfied in order to apply the Patch. The targets 814, e.g., (device1 and device2), may be informed of the dynamic attribute constraint and the appropriate event buffers 816. Accordingly, the targets may can start sending events to the event buffers 816 when the constraint is met, e.g., the CPU usage is less than or equal to 50% of capacity. The application of a management operation may be further constrained by a specified time. The specified time may limit the time within which the management operation may be applied, once the dynamic constraint is met. In this manner, a management operation may only be applied if the dynamic attribute constraint is met within the specified time. The targets 814 may receive the specified time along with the dynamic attribute constraint. The time constraint may be specified as a time window or a time span. With a time window, the management operation may only be applied if the event is received within the time window. With the time span, the management operation may only be applied within the specified period of time, after an event is received. For example, the Patch may be applied only within the first minute after an event is received specifying that the CPU usage is at or below 50%. Using time limitations may advantageously improve real-time scheduling of management operations. The time information is sent to the target is to let the target know that information about an event, such as the CPU usage, is expected periodically. Accordingly, the target then knows that it needs to inform the corresponding event buffer about the CPU usage at the end of each specified period.

Figure 9:
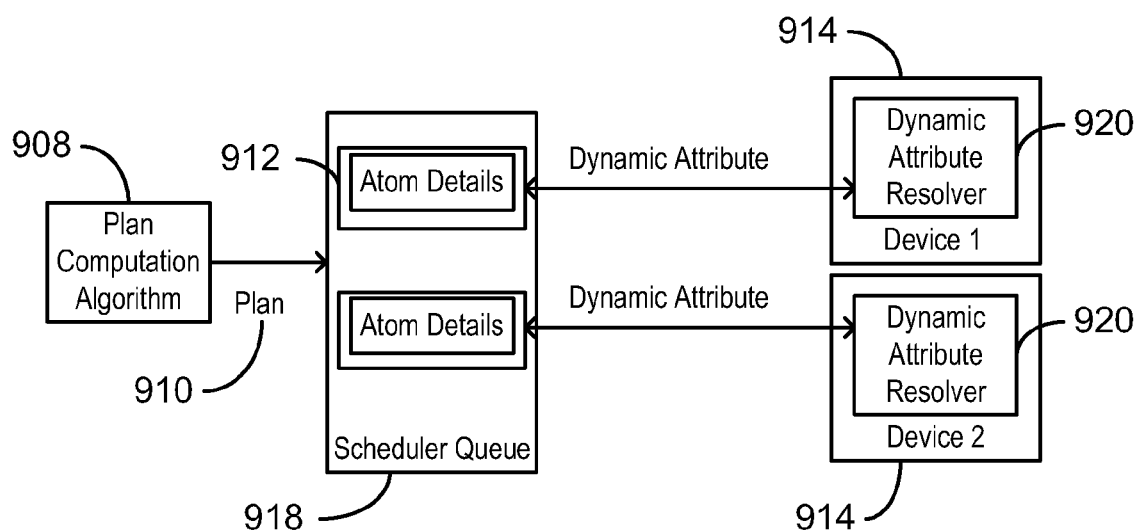
FIG. 9 is a block diagram of an example architecture for synchronous resolution of dynamic attribute constraints.

FIG. 9 is a block diagram of an example architecture 900 for synchronous resolution of dynamic attribute constraints. The architecture 900 functions similarly to the architecture 800, except with regard to the behavior of the plan computation algorithm 808. The plan computation algorithm 908 may initialize atomic tasks 912 as described with reference to FIG. 8. However, the atomic tasks 912 may not include event buffers 816, as there is no need to store asynchronous events. Rather, in the architecture 900, the atomic tasks 912 may, at scheduling time, make a synchronous call to the respective targets 914. In that call, the dynamic attribute constraint may be passed to the target 914. The target 914 may send back an immediate response regarding resolution of the dynamic attribute constraint.

Figure 10:
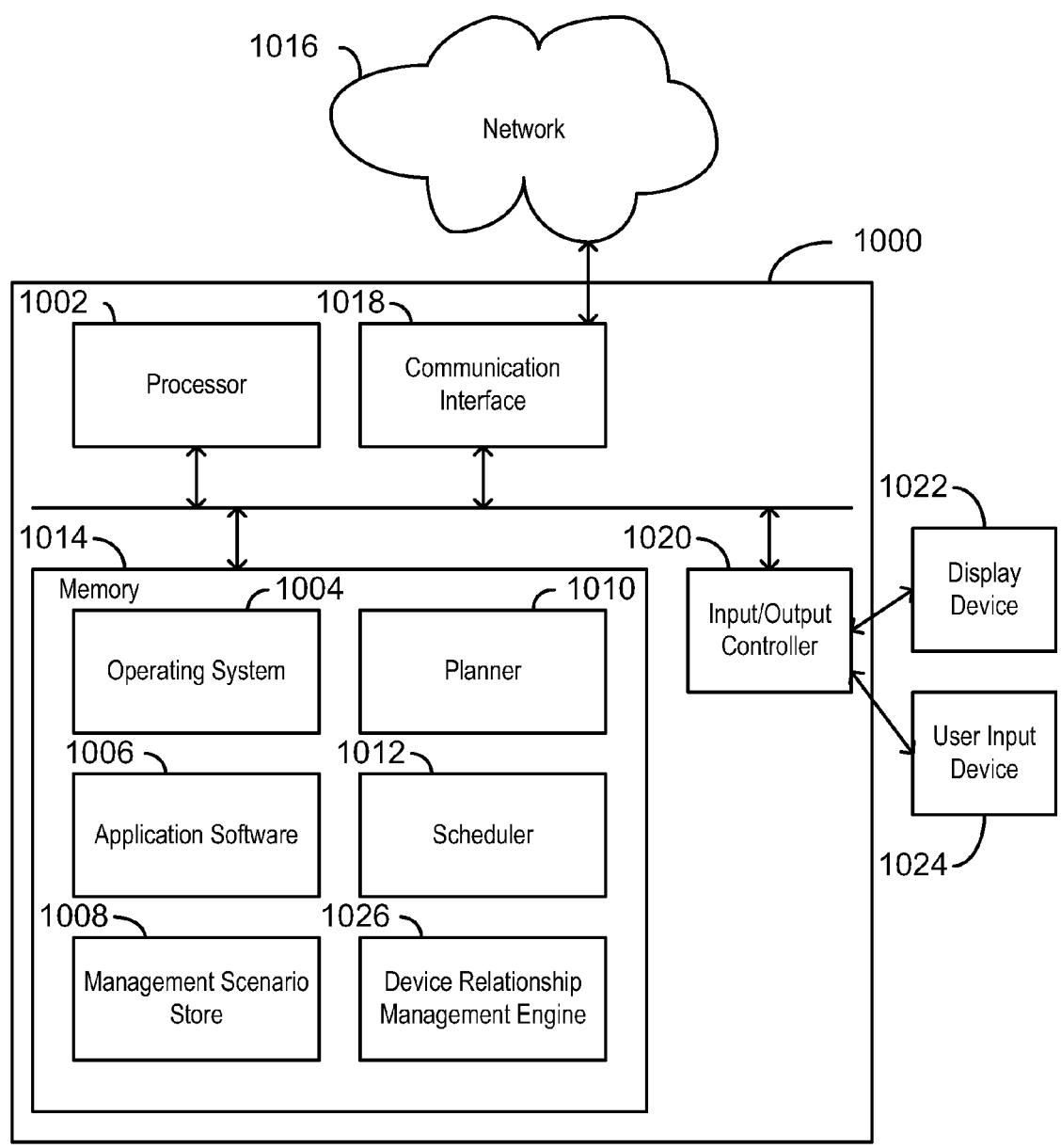
FIG. 10 illustrates an exemplary computing-based entity in which embodiments of a system for managing groups of entities may be implemented.

FIG. 10 illustrates various components of an exemplary computing based entity 1000 which may be implemented as any form of a computing a electronic entity, and in which embodiments of entity management may be implemented.

Computing-based entity 1000 comprises one or more processors 1002 which may be microprocessors, controllers or any other suitable type of processors for processing computing executable instructions to control the operation of the entity in order to manage groups of entities. In some examples, for example, where a system on a chip architecture is used, the processors 1002 may include one or more fixed function blocks which implement a part of the method of managing groups of computing entities in hardware (rather than software or firmware). Platform software comprising an operating system 1004 or any other suitable platform software may be provided at the computing-based entity to enable application software 1006 to be executed on the entity. A entity relationship management engine 1026 may also be executed on the entity. Management scenarios may be stored in a management scenario store 1008 implemented at memory 1014. A planner 1010 and a scheduler 1012 may be provided at the computing-based entity 1000.

The computer-executable instructions may be provided using any computer-readable media that is accessible by computing-based entity 1000. Computer-readable media may include, for example, computer storage media such as memory 1014 and communications media. Computer storage media, such as memory 1014, includes volatile and non-volatile, removable and non-removable media implemented in any method or technology for storage of information such as computer: readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage entities, or any other medium that can be used to store information for access by a computing entity. In contrast, communication media may embody computer readable instructions, data structures, program modules, or other data in a modulated data signal, such as a carrier wave, or other transport mechanism. Although the computer storage media (memory 1014) is shown within the computing-based entity 1000 it will be appreciated that the storage may be distributed or located remotely and accessed via a network 1016 or other communication link (e.g. using communication interface 1018).

An output is also provided such as an audio a video output to a display system integral with or in communication with the computing-based entity. The display system may provide a graphical user interface, or other user interface of any suitable type although this is not essential.

The computing-based entity 1000 also comprises an input controller 1020 arranged to output display information to a display entity 1022 which may be separate from or integral to the computing-based entity 1000. The display information may provide a graphical user interface. The input controller 1020 is also arranged to receive and process input from one or more entities, such as a user input entity 1024 (e.g. a mouse or a keyboard). This user input may be used to input user designed management scenarios. In an embodiment the display entity 1022 may also act as the user input entity 1024 if it is a touch-sensitive display entity. The input controller 1020 may also output data to entities other than the display entity, e.g. a locally connected printing entity (not shown in FIG. 10).

Figure 11:
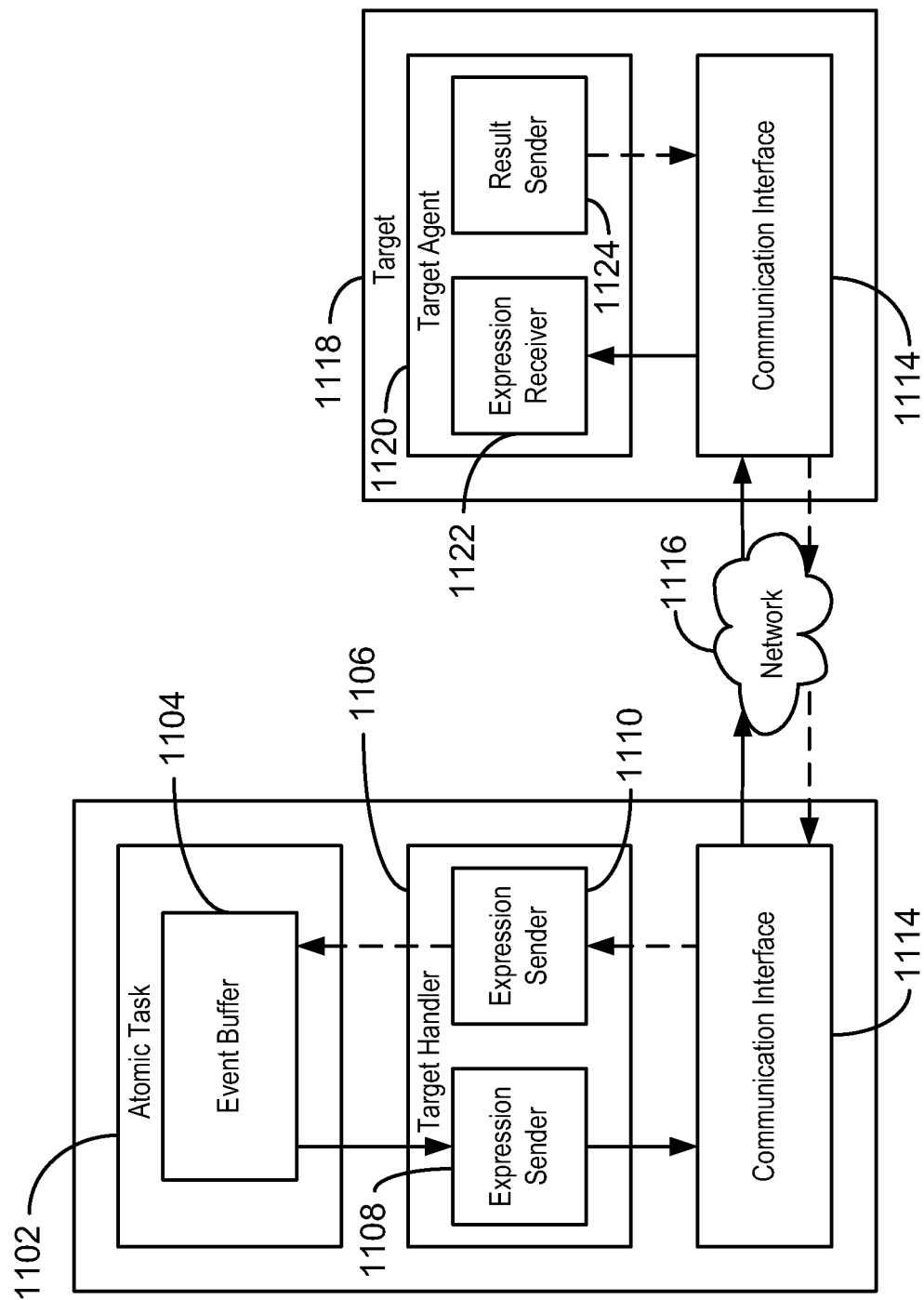
FIG. 11 is a block diagram of an example system for asynchronous resolution of dynamic attribute constraints.
Figure 12:
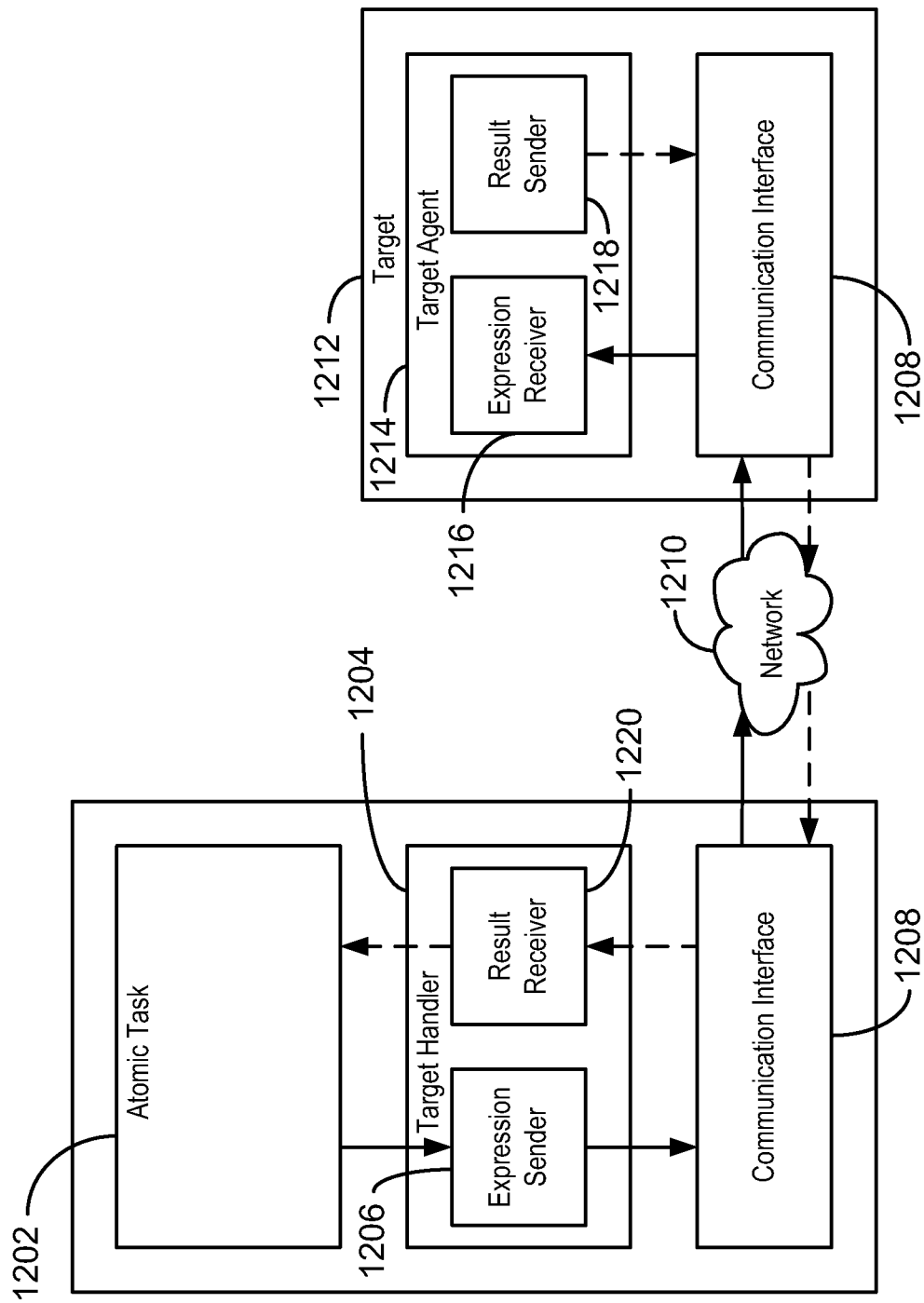
FIG. 12 is a block diagram of an example system for synchronous resolution of dynamic attribute constraints.

FIGS. 11-12 are example systems 1100, 1200 for resolution of dynamic attribute constraints. In the systems 1100, 1200, an expression specifying a dynamic attribute constraint may be used to control the application of management operations. Expressions are also referred to herein as filters. An expression may be the abstract base for scenario-specific expressions of various types. The types may including expressions, SQL queries, etc. Each expression may provide methods to serialize itself into, or deserialize itself from, the data format (e.g., XML) used to send the expression over a communication network 1116, 1210. The following is an example grammar for specifying expressions in BNF format.

<filter> ::= <boolean_query> | not( <filter> ) | <filter> and <filter> |<filter> or <filter> | <numerical_query> = <numerical_constant> | <numerical_query> <= <numerical_constant> | <text_query> = <text_constant>

<boolean_query>::=a call to an exogeneous method that returns a Boolean value or a Linq query expression that evaluates to boolean.

<numerical_query>::=a call to an exogeneous method that returns an integer, a floating point value, or a Linq query expression that evaluates to 32-bit integer, 64-bit integer, or double precision floating point.

<text_query>::=call to an exogeneous method that returns a string

<numerical_constant>::=any well-formed integer or floating point literal value

<text_constant>::=any well-formed string literal

The atomic tasks may only be executed when the filter evaluates to true. If not, the execution may be postponed for as long as the filter evaluates to false. An execution engine may call the filter evaluation repeatedly, until the returned value is true. In both synchronous and asynchronous cases, filters may be evaluated at the last possible minute before effectively starting an atomic task. Advantageously, this may prevent, for instance, starting a system update on a target that is performing a critical operation, such as an information rights management (IRM) device that is effectively operating.

There are two different uses of filters with slightly different semantics, depending on whether the filter is evaluated by a synchronous call to the target, or an asynchronous approach, e.g., event-driven from the target. For the synchronous case, the "last-minute condition," may be checked via a function call. In this manner, a general plug-in mechanism may be used to query exogenous sources for the dynamic attribute. This approach follows a "pull" semantic. As such, the atomic task is considered for enactment (e.g. all its dependencies are resolved), the appropriate function may be called to retrieve a dynamic attribute value. The result of the filter may then be evaluated accordingly. If the expression evaluates as true, the atomic task may be enacted. If not, the expression may be checked again. For repeated evaluations, the frequency at which calls to the filter are repeated may vary between implementations. The execution engine may not postpone the atomic task indefinitely.

The asynchronous approach may represent "push" semantics. As such, the filter may be deployed to the target. This deployment may be done at any time by the execution engine. In some cases, the filter may be deployed only when the evaluation of the filter becomes required. In other words, the filter may be deployed only when all other dynamic attribute dependencies are resolved. Alternatively, the need for filter evaluations may be anticipated. As such, the filters may be deployed earlier, for instance, at the start of the engine execution. In this way, the delay caused by evaluation time may be reduced. As such, the target may be responsible for evaluating the filter regularly, and notifying the execution engine of changes through an event mechanism.

One source of errors to be aware of when using filters is that no operation is instantaneous. In particular, when a filter evaluates to true at some instant, this will cause the enactment of the corresponding task. In some cases, there is a possibility that a filter initially evaluated as true, may become false before, or during enactment of the atomic task.

FIG. 11 is a block diagram of an example system 1100 for asynchronous resolution of dynamic attribute constraints. The system 1100 includes an atomic task 1102, a target handler 1106, communication interfaces 1114, a network 1116, a target 1118, and a target agent 1120.

The atomic task 1102 represents one management operation to be performed on a single target 1118 based on a list of constraints. The target 1118 may be any entity capable of receiving management operations such as a personal computer, an embedded device, a server, an application, a service, etc. The atomic task 1102 includes an event buffer 1104. The event buffer 1104 may be a storage area inside the atomic task 1102 that stores information about the expressions for the atomic task 1102. This information may specify expressions that belong to the atomic task 1102, whether or not the expressions have already been evaluated on the target 1118, and the result of any evaluation. The atomic task 1102 may determine, based on the contents of the event buffer 1104, whether all constraints have been met for activating the atomic task 1102. This determination may be made in response to a query from the runtime scheduler. If all expressions have success evaluation results stored in the event buffer 1104, the atomic task 1102 may indicate to the runtime scheduler that all conditions are met. If not, the atomic task 1102 may indicate that the conditions are not met.

The event buffer 1104 sends expressions to the target 1118 and receives evaluation results from the target 1118 via a target handler 1106. The target handler 1106 includes an expression sender 1108. The target handler 1106 may use the expression sender 1108 to send expressions to the target 1118. The sender 1108 may trigger the serialization of the expression into raw data, send the data to the target 1118, send an event buffer reference to the target, and directly return control back to the task 1102. The event buffer reference may specify where the target can send the result of the expression. The sender 1108 does not receive responses from the target 1118.

The target agent 1120 may be a handler component embedded into the target 1118 that receives expression data from the sender 1108, via an expression receiver 1122. The receiver 1122 may convert the received data into a specific expression, pick up the resulting specific expression, and request evaluation of the expression for the target 1118 by the target agent 1120. The target agent 1120 may be idle until it can evaluate the expression for the target 1118. The target agent 1120 may from time to time attempt to evaluate the expression for the target 1118. Once the target agent 1120 evaluates the expression, the target agent 1120 may send the result of the evaluation via an embedded result sender 1124 back to the result receiver 1110 embedded into the target handler 1106.

The target handler 1106 and target agent 1120 may register scenario-specific expressions and expression evaluation results. The scenario-specific expressions may be the dynamic attribute constraints. For example, an expression can be something like "process p is not running," or "Cpu usage <50%." Registered expressions simply refers to expression held in the event buffers. Further, the target handler 1106 and target agent 1120 may convert data that represents serialized expressions into and from instances of the registered expressions. This conversion may be performed by detecting the type of expression from the data, and passing the data to a de-serialization method of the registered expression. The deserialization method may convert the raw data into an expression.

FIG. 12 is a block diagram of an example system 1200 for synchronous resolution of dynamic attribute constraints. The system 1200 includes an atomic task 1202, a target handler 1204, communication interfaces 1208, network 1210, a target 1212, and a target agent 1214.

The atomic task 1202 may trigger the target handler 1204 for expressions that are sent to the target 1212 following a synchronous request-response-schema. The synchronous request-response schema refers to the set of messages that pass between the event buffer and the target 1212 in order to evaluation an expression. The target handler 1204 may trigger the serialization of the expression into raw data, send the data via an embedded expression sender 1206 to the target 1212, and wait for a response. Any further operations of the atomic task 1202 may be blocked until the target handler 1204 receives a response, or times out. The target handler 1204 may pass the result (either the response data or a timeout notification) back to the atomic task 1202.

The target agent 1214 may be a handler component embedded into the target 1212 that receives expression data from the expression sender 1206 via an embedded expression receiver 1216. The target handler 1214 may convert the received data to a specific expression, pick up the resulting specific expression, evaluate the expression for the target 1212, and immediately send the result of the evaluation via an embedded result sender 1218 back to the result receiver 1220 embedded into the target handler 1204.

The term 'computer' is used herein to refer to any entity with processing capability such that it can execute instructions. Those skilled in the art will realize that such processing capabilities are incorporated into many different entities and therefore the term 'computer' includes PCs, servers, mobile telephones, personal digital assistants and many other entities.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage entities utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or entity value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

What is claimed is:

1. A method for managing a plurality of computing entities, comprising:
    sending a dynamic attribute dependency to one or more of the computing entities, wherein the dynamic attribute dependency specifies a constraint for performing a management operation on the one or more computing entities;
    scheduling, according to a plan, an atomic task to perform the management operation on each of the one or more computing entities based on whether the constraint is resolved;
    determining that the constraint is resolved asynchronously;
    performing the atomic task if the constraint is resolved, wherein the constraint is resolved if the condition is met during a specified time range, and wherein the atomic task is performed within a time period after the constraint is resolved, the computing entities comprising a first group and a second group, the condition specifying the first group and the second group, the condition being based on location;
    generating a buffer for each of the atomic tasks, wherein the buffer is configured to receive the event; and
    sending a reference identifying the buffer to the one computing entity.

2. The method recited in claim 1, comprising querying one of the computing entities to determine whether the constraint is resolved.

3. The method recited in claim 1, comprising receiving an event from one of the computing entities, wherein the event indicates the constraint is resolved.

4. The method recited in claim 1, wherein the constraint specifies the condition for the dynamic attribute, and wherein the constraint is resolved if the condition is met.

5. The method recited in claim 1, the condition specifying that a process is not executing.

6. A system for managing a plurality of computing entities, comprising:
    a processing unit; and
    a system memory, wherein the system memory comprises code configured to direct the processing unit to:
        send a dynamic attribute dependency to one or more of the computing entities, wherein the dynamic attribute dependency specifies a constraint for performing the management operation, wherein the constraint specifies a condition for a dynamic attribute of each of the computing entities, and wherein the constraint is resolved if the condition is met after a wait time, the computing entities comprising a first group and a second group, the condition specifying the first group and the second group, and the wait time defaulting to zero when not specified;
        schedule, based on a plan, an atomic task to perform the management operation on each of the one or more computing entities;
        determine that the constraint is resolved asynchronously;
        perform the atomic task if the constraint is resolved;
        generate a buffer for each of the atomic tasks, wherein the buffer is configured to receive the event; and
        send a reference identifying the buffer to one of the computing entities.

7. The system recited in claim 6, wherein the system memory comprises code configured to direct the processing unit to query one of the computing entities to determine whether the constraint is resolved.

8. The system recited in claim 6, wherein the system memory comprises code configured to direct the processing unit to receive an event from one of the computing entities, wherein the event indicates the constraint is resolved.

9. The system recited in claim 6, the first group comprising non-critical entities, and the second group comprising critical entities.

10. One or more tangible, computer-readable storage memories, comprising code configured to direct a processing unit to:
    send a dynamic attribute dependency to one or more computing entities, wherein the dynamic attribute dependency specifies a constraint for performing a management operation;
    schedule, based on a plan, an atomic task corresponding to perform the management operation on each of the one or more computing entities based on whether the constraint is resolved;
    determine that the constraint is resolved asynchronously;
    perform the atomic task if the constraint is resolved, wherein the constraint is resolved if the condition is met during a specified time range, and wherein the atomic task is performed within a time period after the constraint is resolved, the computing entities comprising a first group and a second group, the condition specifying the first group and the second group, the condition being based on location, and the time period defaulting to zero when not specified;

generate a buffer for each of the atomic tasks, wherein the buffer is configured to receive the event; and send a reference identifying the buffer to one of the computing entities.

11. The one or more tangible, computer-readable storage memories recited in claim 10, comprising code configured to direct the processing unit to receive an event from one of the computing entities, wherein the event indicates the constraint is resolved.

12. The one or more tangible, computer-readable storage memories recited in claim 10, wherein the constraint specifies the condition for a dynamic attribute of each of the computing entities.

* * * * *